US009130377B2

(12) United States Patent
Barsukov et al.

(10) Patent No.: US 9,130,377 B2
(45) Date of Patent: Sep. 8, 2015

(54) SYSTEM AND METHOD FOR BATTERY PACK MANAGEMENT USING PREDICTIVE BALANCING

(75) Inventors: Yevgen Pavlovich Barsukov, Richardson, TX (US); Yandong Zhang, Plano, TX (US); Jason M. Battle, Wylie, TX (US); Konstantin Galburt, Fremont, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 438 days.

(21) Appl. No.: 13/620,842

(22) Filed: Sep. 15, 2012

(65) Prior Publication Data

US 2014/0077752 A1    Mar. 20, 2014

(51) Int. Cl.
*H02J 7/00* (2006.01)

(52) U.S. Cl.
CPC ............. *H02J 7/0016* (2013.01); *H02J 7/0021* (2013.01)

(58) Field of Classification Search
CPC ............................... H02J 7/0016; H02J 7/0021
See application file for complete search history.

(56) References Cited

U.S. PATENT DOCUMENTS

| 6,789,026 | B2 | 9/2004 | Barsoukov et al. |
| 6,832,171 | B2 | 12/2004 | Barsoukov et al. |
| 6,892,148 | B2 | 5/2005 | Barsoukov et al. |
| 7,248,053 | B2 | 7/2007 | Houldsworth |
| 7,259,572 | B2 | 8/2007 | Houldsworth et al. |
| 7,315,489 | B2 | 1/2008 | Houldsworth |
| 7,443,140 | B2 | 10/2008 | Barsukov et al. |
| 7,808,244 | B2 | 10/2010 | Barsukov et al. |
| 7,856,328 | B2 | 12/2010 | Barsoukov et al. |
| 8,049,465 | B2 | 11/2011 | Barsoukov et al. |
| 2007/0029970 | A1 | 2/2007 | Barsukov et al. |
| 2009/0099799 | A1 | 4/2009 | Barsoukov et al. |
| 2009/0099802 | A1 | 4/2009 | Barsoukov et al. |
| 2009/0248331 | A1 | 10/2009 | Barsukov |
| 2009/0261786 | A1 | 10/2009 | Hsu et al. |
| 2009/0295397 | A1 | 12/2009 | Barsukov |
| 2011/0031944 | A1 | 2/2011 | Stirk et al. |
| 2011/0089901 | A1 | 4/2011 | White et al. |
| 2011/0260687 | A1 | 10/2011 | Kudo et al. |
| 2012/0049802 | A1 | 3/2012 | Barsukov et al. |
| 2012/0074898 | A1 | 3/2012 | Schwartz |
| 2012/0091963 | A1 | 4/2012 | Vance et al. |
| 2012/0143585 | A1 | 6/2012 | Barsukov et al. |

OTHER PUBLICATIONS

PCT Search Report mailed Dec. 24, 2013.
Yevgen Barsukov, "Battery Cell Balancing: What to Balance and How", Texas Instruments Inc., presented in Portable Power Design Seminar, Boston, May 9, 2006, pp. 2-1 through 2-8.

*Primary Examiner* — Vuthe Siek
*Assistant Examiner* — Aric Lin
(74) *Attorney, Agent, or Firm* — William B. Kempler; Frank D. Cimino (57) ABSTRACT

Predictive battery pack cell balancing apparatus and methods are presented in which active bypass current switching is controlled according to initial balancing bypass current values to balance the cell depth of discharge (DOD) values by the end of a charging/discharging time period, and according to continuous balancing bypass current values representing an amount of bypass current needed to maintain a present relationship of the cell DOD values.

20 Claims, 6 Drawing Sheets

SYSTEM AND METHOD FOR BATTERY PACK MANAGEMENT USING PREDICTIVE BALANCING

FIELD OF THE INVENTION

The present disclosure relates to the field of electrical circuits, and more particularly to systems and methods for battery management using predictive balancing.

BACKGROUND OF THE INVENTION

Battery packs have become an essential facet of modern technology for consumer, automotive, medical, computing and industrial products. Battery management systems, including so-called battery fuel gauges or gas gauges, are used to control the charging and discharging of battery cells within a battery pack, to perform cell balancing operations, as well as to provide estimates of remaining battery cell capacity. Battery cells are often connected in series configurations to provide the necessary voltages required by specific applications. More recently, asymmetric battery stacks have been proposed for automotive and other applications in which the individual cells forming the battery pack are of different capacities to facilitate increased pack capacities while making the best use of limited end equipment chassis space. However, asymmetric battery stacks present difficulties for cell balancing, where conventional voltage equalization type balancing techniques are not optimal, and fairly large bypass current levels are sometimes needed. Accordingly, a need remains for improved apparatus and techniques for managing battery packs.

SUMMARY OF THE INVENTION

Various aspects of the present disclosure are now summarized for compliance with 37 CFR §1.73 to facilitate a basic understanding of the disclosure by briefly indicating the nature and substance of the disclosure, wherein this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter, and this summary is submitted with the understanding that it will not be used to interpret or limit the scope or meaning of the claims.

Predictive balancing techniques are presented for managing multi-cell battery packs which can be advantageously employed to facilitate active balancing in symmetric and/or asymmetric stacks. Bypass current control is provided in the disclosed embodiments for active balancing of the battery cells according to both initial balancing and continuous balancing values to facilitate depth of discharge (DOD) balancing over the remainder of a charging or discharging operation as well is to maintain DOD cell relationships within the battery pack.

A system is provided for battery pack management, including a bypass circuit with one or more energy storage components such as inductors and/or capacitors and switching devices to selectively allow conduction of bypass current from and/or to individual battery cells. The system further includes a controller that provides control signals to the switching devices at a switching frequency for corresponding on times in each of a plurality of time intervals for active cell balancing. A predictive balancing component computes the on times at least partially according to initial balancing bypass current values as well as continuous balancing bypass current values in order to balance the cell depths of discharge by the end of a charge or discharge operation as well as to maintain the present relationship between the cell DODs.

In certain embodiments, the initial balancing bypass currents are determined at least partially according to estimated present DOD values, and the continuous balancing bypass currents are determined according to differences in total charge capacity values of the battery cells and the total pack current. Certain embodiments include a balancing current enforcement component that determines theoretical maximum bypass current values for the cells. The enforcement component also determines requested cell bypass current values by summing the corresponding initial balancing bypass current value with the corresponding continuous balancing bypass current value for each of the cells, and determines individual on times as a fraction of the present time interval according to the ratio of the requested cell bypass current value and the corresponding theoretical maximum bypass current value. In certain embodiments, the predictive balancing component determines actual cell bypass current values of a previous time interval, determines a plurality of scaling factors individually corresponding to one of the battery cells, and determines the theoretical maximum current values based at least partially on the scaling factors.

The predictive balancing component in certain embodiments selectively lowers the switching frequency if one or more of the on times exceeds a duration of a present time interval. In addition, certain embodiments of the predictive balancing component selectively adjust relative starting times of provision of the switching control signals and a cell voltage measurement within successive periodic time intervals.

Methods and computer readable mediums are provided with instructions for managing a battery pack. The method in certain embodiments includes determining initial balancing bypass current values at least partially according to estimated present battery cell depth of discharge (DOD) values, and determining continuous balancing bypass current values based at least in part on total pack current and differences in total charge capacities of the battery cells. The method further includes determining a plurality of on times for conduction of bypass current to and/or from individual battery cells at least partially according to the initial balancing bypass current values and the continuous balancing bypass current values, and controlling conduction of bypass currents in a present time interval according to the of on times.

Certain embodiments of the method further include determining theoretical maximum bypass current values corresponding to the battery cells, as well as determining requested cell bypass current values based on the initial balancing bypass current values and the continuous balancing bypass current values, with the on times being determined at least partially based on a ratio of the corresponding requested cell bypass current values and the corresponding theoretical maximum bypass current values.

In certain implementations, moreover, actual cell bypass current values of a previous time interval are determined at least partially according to estimated bypass current values, the total pack current, and a bypass efficiency parameter. The method in these embodiments further includes determining scaling factors for a present time interval as a ratio of the requested cell bypass current value and the corresponding actual cell current value from the previous time interval multiplied by a corresponding scaling factor from the previous time interval, and using the scaling factors to determine the theoretical maximum current values.

The method in certain embodiments further comprises computing the individual on times based on summations of the corresponding initial balancing and continuous balancing bypass current values, and selectively lowering the switching frequency if one or more of the on times exceeds a duration of a present time interval. In certain embodiments, moreover, the method includes selectively adjusting relative starting times of provision of the switching control signals in a cell voltage measurement within successive time intervals.

DESCRIPTION OF THE VIEWS OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

One or more embodiments or implementations are hereinafter described in conjunction with the drawings, wherein like reference numerals are used to refer to like elements throughout, and wherein the various features are not necessarily drawn to scale.

Figure 1:
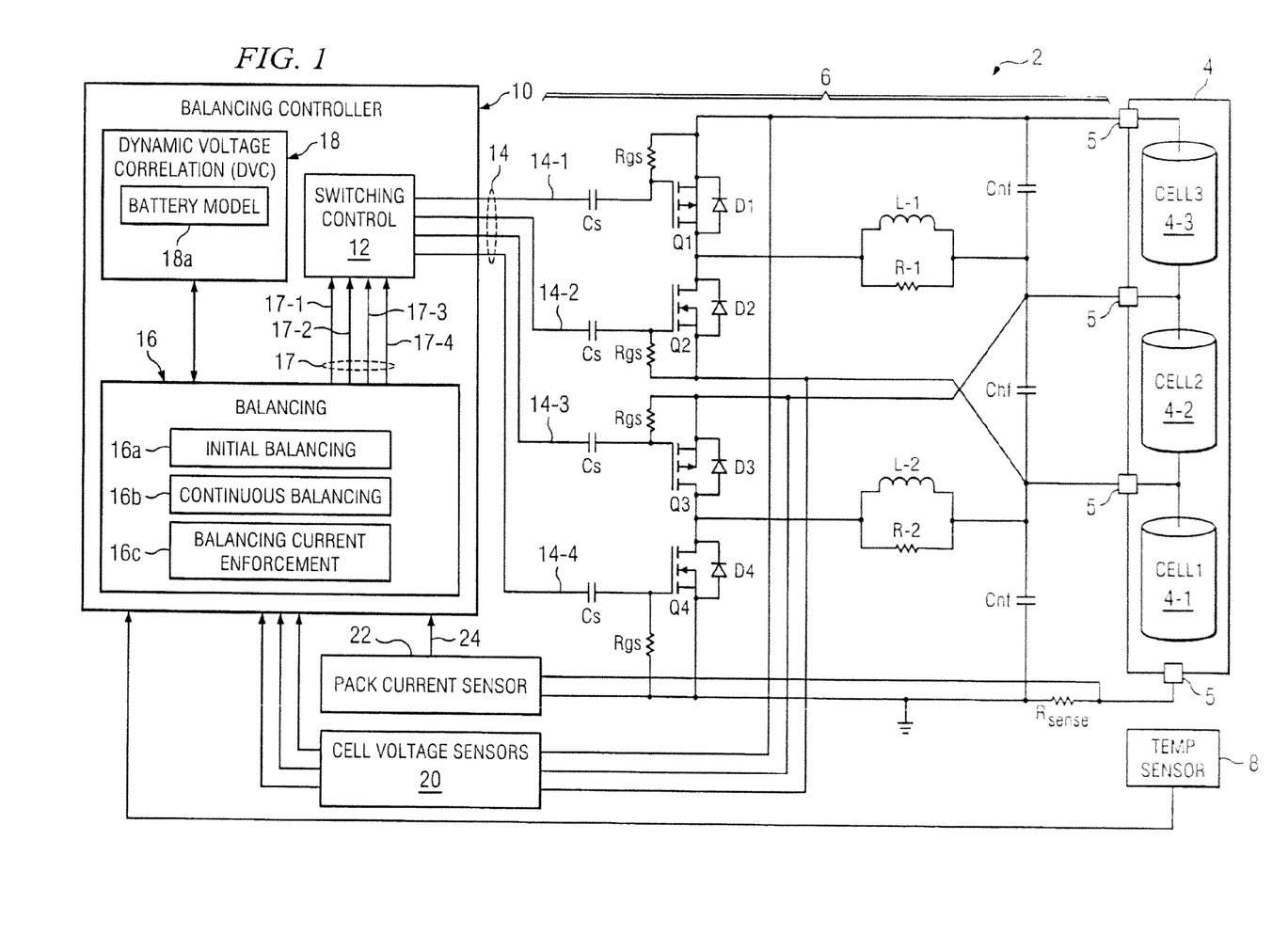
FIG. 1 is a simplified schematic diagram illustrating an embodiment of battery pack management system with a bypass circuit and a balancing controller having a switching controller and a predictive balancing component providing switcher on times based on initial balancing bypass current values and continuous balancing bypass current values.

FIG. 1 illustrates a battery pack management system 2 for managing and assessing various operational aspects of a multi-cell battery pack 4. The system 2 includes a bypass circuit 6 connected directly or indirectly with the cells 4-1, 4-2 and 4-3 of the battery pack 4, as well as a balancing controller 10 with a switching controller 12, a balancing component 16 with initial balancing, continuous balancing and balancing current enforcement components 16a, 16b and 16c, respectively, as well as a dynamic voltage correlation (DVC) component 18 with a battery model 18a. In addition, the illustrated system 2 includes a temperature sensor 8 physically positioned proximate to the battery pack 4 or in the battery pack ambient environment, as well as one or more cell voltage sensors 20 and a total pack current sensor 22 providing a pack current signal or value 24 representing the pack current measured by a sense resistor $R_{SENSE}$. The balancing component 16 provides on time signals or values 17-1, 17-2, 17-3 and 17-4 to the switching controller 12 for generation of switching control signals 14-1, 14-2, 14-3 and 14-4 provided to the bypass circuit 6 for operation of switching devices Q1-Q4 to selectively cause conduction of bypass currents for active cell balancing. Other components (not shown) may be provided in the system 2, including without limitation in-line protection components such as positive temperature coefficient (PTC) components for protecting against over-current situations, in-line thermal cut off (TCO) devices for preventing battery pack overheating, etc., the details of which are omitted so as to avoid obscuring the various predictive balancing concepts described hereinafter.

The system 2 may be implemented in a variety of forms and configurations, such as a single integrated circuit or printed circuit board including one or more processing elements as well as associated memory and circuitry to implement the battery cell balancing and management concepts disclosed herein, as well as for performing one or more additional functions such as gas gauging, cell capacity assessment and reporting functions, and interfacing with external systems. In other possible embodiments, the system 2 can be created from multiple components individually comprising analog and/or digital hardware, processing elements and associated electronic memory, processor-executed software, processor-executed firmware, programmable logic and/or combinations thereof.

In the example of FIG. 1, a 3-S battery pack 4 is illustrated including three battery cells 4-1, 4-2 and 4-3 connected with one another in a series configuration, although any number of two or more cells may be used to form a multi-cell battery pack 4 connected in any suitable series and/or series/parallel fashion. In the illustrated example, moreover, the center cell 4-2 is of a larger capacity than the first and third cells 4-1 and 4-3, although not a strict requirement of the present disclosure. As noted above, conventional voltage-balancing techniques are particularly unsuitable for asymmetric battery packs 4, wherein the predictive balancing concepts of the present disclosure may be used in association with asymmetric battery packs for of any number of cells forming a multi-cell battery pack 4, as well as with symmetric packs. The battery pack 4 may include one or more terminals 5 allowing connection to the system 2, or an integrated battery pack/controller system 2 may be provided which includes an onboard battery cell pack 4. The bypass circuit 6 is connected to the battery pack terminals 5 and includes field effect transistor (FET) type switching devices Q1, Q2, Q3 and Q4 as well as corresponding rectifier devices D1, D2, D3 and D4 individually coupled across a corresponding one of the switching devices Q1-Q4, where the rectifiers D1-D4 maybe body diodes of the FETs Q1-Q4 or may be separate rectifier components. A gate-source resistor Rgs is connected between the gate and source terminals of each of the FETs Q1-Q4, and the FETs Q1 and Q3 are P channel enhancement mode devices, whereas Q2 and Q4 are N channel enhancement mode FETs. Any suitable form of switching devices Q1-Q4 may be used in the bypass circuit 6, including without limitation semiconductor-based switches operable at a relatively high switching frequency to implement the active cell balancing functions described herein by selective conduction of bypass current. The gate terminals of the switching devices Q1-Q4 are capacitively coupled through switching capacitors Cs to receive switching control signals 14-1, 14-2, 14-3, 14-4 from the switching controller 12.

The bypass circuit 6 also includes inductive energy storage components L-1, L-2 to facilitate active balancing for redistribution of charge between two or more of the cells 4. Also, the illustrated bypass circuit 6 includes high frequency capacitors Chf connected in parallel across each of the battery cells 4, and the inductors L-1 and L-2 are parallel connected across a corresponding discharge resistor R-1 and R-2, respectively. Other active rebalancing bypass circuits 6 may be used which include other forms of energy storage components, such as switched capacitor bypass circuits 6 (not shown). The switching devices Q1-Q4 are individually operable in a first state (ON) to cause conduction of bypass current from one of the battery cells 4-1, 4-2, 4-3 to one of the inductors L-1, L-2 and in a second state (OFF) to allow conduction of bypass current via one of the rectifiers D1-D4 from the inductor to another cell 4. In the illustrated example, Q1 and Q3 are P channel enhancement mode FETs and the corresponding switching control signals 14-1 and 14-3 are active low, whereby a low signal 14-1 or 14-3 places a corresponding switching device Q1, Q3 in the ON or conductive state. Conversely, the switching controller 12 provides active high switching control signals 14-2 and 14-4 to the N channel devices Q2 and Q4, respectively.

The active balancing operation of the system 2 can be undertaken during a charging operation, during discharging (e.g., while the battery pack 4 is driving a load (not shown)), and/or while the pack 4 is in a relaxation mode. In operation, the balancing controller 10 uses the switching controller 12 to selectively provide the switching control signals 14 in one embodiment as approximately 50% duty cycle on/off signals during an on time defined by the on time signals or values 17 provided by the balancing component 16. In this regard, the switching controller 12 in certain embodiments employs a 2 MHz oscillator with the switching signals 14 being provided at a 2 MHz switching frequency (or other adjusted switcher frequency) while the associated on time signal or value 17 is active. In each high frequency switching cycle (during the on time), the corresponding switching device is turned on for approximately half the high frequency cycle (e.g. for approximately 250 ns), and is then turned off for the remainder of the high frequency cycle (e.g., 250 ns). During the time the switching device is on, current will conduct from a designated one of the cells 4 through one of the inductors L-1, L-2. Then, when the switching device is turned off, current will continue to flow through the inductor L-1, L-2 to another one of the cells 4. In this manner, the switching operation of the switching devices Q1-Q4 under control of the switching controller 12 provides for selective active balancing to transfer current from one of the cells to another cell 4. The provision of the on time signals or values 17-1, 17-2, 17-3 and 17-4 by the balancing component 16 allows individualize control of active balancing current flow (referred to herein as "bypass currents") to facilitate the predictive balancing techniques described herein, which use computed initial balancing bypass current values as well as continuous balancing bypass current values via the components 16a and 16b, with a balancing current enforcement component 16c to generate the on times 17.

To illustrate the charge redistribution aspects of the active balancing operation of the controller 10 and the bypass circuit 6, the following description illustrates operation of the system 2 during one such 500 ns high-frequency switching cycle for the case where it is desired to remove charge from the center cell 4-2 for charging another one of the cells (e.g., the third cell 4-3). In the first part of the cycle, Q2 is turned on via switching signal 14-2 (active high), causing a discharge current (bypass current) to flow from the top of cell 4-2 through L-1 and Q2 into the bottom of cell 4-2 (top of cell 4-1). The magnitude of this bypass current flow is determined by the inductance of L-1 and the drain-source on resistance of Q2, where the bypass current initially ramps up from zero until Q2 is turned off (e.g. approximately 250 ns for a 2 MHz switching frequency example). In this regard, the longer Q2 is turned on, the higher the maximum bypass current will be.

When Q2 is turned off (signal 14-2 going low), the bypass current will flow from L-1 through the diode D1 connected across the upper FET Q1. The bypass current flowing through the diode D1 is the same level of current that was flowing before (from the inductor L-1), but now flows from the bottom of cell 4-3 through the inductor L-1 to the top of cell 4-3, and thus charges cell 4-3. In addition, the current begins from the peak value and decreases to zero based on the inductance of L-1, where the parallel-connected resistor R-1 is provided to ensure complete discharge of the inductor L-1 and typically does not dissipate any significant power. In this manner, charge is transferred from cell 4-2 to cell 4-3. Similar transferring operation is provided by selective switching of the other switching devices Q1, Q3 and Q4, whereby selective provision of switching signals 14 by the switching controller 12 allows selective transfer of charge via bypass current flow in the bypass circuit 6. For instance, Q1, L-1 and D2 can be employed via signal 14-1 to transfer charge from cell 4-3 to cell 4-2; Q3, L-2 and D4 can be operated using signal 14-3 to transfer charge from cell 4-2 to cell 4-1; and Q4, L-2 and D3 can be used via signal 14-4 to transfer charge from battery cell 4-1 to battery cell 4-2.

As mentioned above, switched capacitor type circuits or other forms of bypass circuitry 6 can be used in the system 2 for active balancing of the battery cells 4-1, 4-2, 4-3, including at least one energy storage device (e.g., inductive, capacitive, and/or combinations thereof, etc.), where selective activation of the switching devices in one state provides bypass current conduction from at least one of the battery cells to at least one of the energy storage components, and in another state allows bypass current to flow from one or more energy storage components to one or more of the other battery cells. For instance, switched passenger type bypass circuitry 6 can be employed for this operation, by selectively coupling a capacitor (not shown) to be charged via bypass current from one of the cells 4, and then reconnecting the charged capacitor across a different one (or more) of the battery cells 4, in which case no rectifier devices D1-D4 would be needed, and the switching controller 12 could employ any number of switching devices (not shown) and corresponding switching control signals 14 for such charge redistribution (active balancing) operation.

The balancing controller 10 and/or components thereof can be implemented using any suitable hardware, processor executed software or firmware, or combinations thereof, wherein an exemplary embodiment of the controller 10 includes one or more processing elements such as microprocessors, processor cores, microcontrollers, DSPs, programmable logic, etc., along with electronic memory and signal conditioning driver circuitry, with the processing element(s) programmed or otherwise configured to perform one or more of the cell balancing functions disclosed herein. For instance, the balancing controller 10 may include or may be operatively coupled with at least one electronic memory storing data and programming instructions to perform the cell balancing and other functionality set forth herein, where such processor-executable instructions may be stored in a non-transitory computer readable medium, such as a computer memory, a memory within a control system (e.g., controller 100), a CD-ROM, floppy disk, flash drive, database, server, computer, etc. integral to and/or operatively coupled for communication with the balancing controller 10. In certain embodiments, for instance, the balancing controller 10 may be an integrated circuit providing the switching controller 12 including one or more switch driver components providing suitable active high or active low switching signal generation functionality for generating the switching control signals 14-1 through 14-4 suitable for operating a selected type of switching device Q1-Q4, and a processor core is provided with suitable memory and I/O capabilities for interfacing with the sensors 8, 20, 22 and with the switching controller 12.

In such embodiments, for instance, the balancing component 16 and the initial balancing, continuous balancing and balancing current enforcement components 16a-16c may be implemented using processor-executed programming instructions stored in a memory in or associated with the balancing controller 10. Moreover, certain embodiments may provide a dynamic voltage correlation (DVC) component 18 for providing estimates of actual bypass current flow values as well as cell depth of discharge estimates based on voltage measurements from the sensors 20, where the DVC component 18 is implemented as processor-executed instructions stored in a memory and a model 18a of the battery pack 4 used by the DVC component 18 may likewise be stored in a memory within, or operatively associated with, the balancing controller 10. One suitable example of a dynamic voltage correlation component 18 is illustrated and described in US patent application publication number 2012/0143585 A1 to Yevgen et al., published Jun. 7, 2012, and entitled "SYSTEM AND METHOD FOR SENSING BATTERY CAPACITY", the entirety of which is hereby incorporated by reference. The balancing component 16 can obtain actual bypass current and/or cell DOD values (estimated or measured) by any suitable means, whether derived from cell voltage measurements or otherwise. The dynamic voltage correlation component 18 advantageously provides actual current value estimates as well as DOD estimates based on the measured cell voltages and cell temperature using a signal or value from the temperature sensor 8 without requiring extra sensing circuitry for directly measuring cell currents and may also facilitate provision of gas gauge functions in the system 2.

As seen in FIG. 1, the predictive balancing component 16 provides the on time signals or values 17-1, 17-2, 17-3, 17-4 to the switching controller 12, where these on times 17 may be electrical signals and/or digital values or messages containing digital values, etc. which indicate or represent the amount of time (or percentage of the time intervals 164) during which the switching signals 14 are to be provided to the switches of the bypass circuit 6. During the prescribed on time for a given channel, the switching controller 12 provides the corresponding switching control signal 14 at the switching frequency (e.g., 2 MHz in one example, with selective adjustment lower by the balancing controller 10), with an approximate 50% duty cycle, and when the on time is completed in a given time interval (e.g., time interval 164 shown in FIGS. 4-6 below) the periodic switching signal ceases. The balancing component 16, moreover, may provide the on time signals or values 17 in a given time interval 164 such that a particular channel may have a zero on time, whereby the corresponding switching device is not actuated in that time interval 164.

For each such time interval 164 (e.g., one second) the balancing component 16 provides updated on time signals or values 17, which are computed at least partially according to initial balancing bypass current values as a function of initial balancing bypass current values $I_{INIT\text{-}1}$, $I_{INIT\text{-}2}$ and $I_{INIT\text{-}3}$ to balance depth of discharge (DOD) values of the cells 4-1, 4-2 and 4-3 by a prospective end time of a charging or discharging operation, and also as a function of continuous balancing bypass current values $I_{CONT\text{-}1}$, $I_{CONT\text{-}2}$ and $I_{CONT\text{-}3}$ to maintain a present relationship of the battery cell DOD values. Depth of discharge, as used herein, is a value associated with a given battery cell 4-1, 4-2 or 4-3 in the illustrated case, representing the amount of discharge from an initial capacity, expressed as a number from 0 through 1 or as a percentage, where 1.0 (or 100%) means that the corresponding battery cell 4 is fully discharged, and 0.0 (or 0%) represents a fully charged cell. The DOD value, moreover, is related to a current battery cell "state of charge" (SOC) by the formula DOD=1−SOC.

The initial balancing component 16a in certain embodiments computes the initial balancing bypass current values $I_{INIT\text{-}1}$, $I_{INIT\text{-}2}$ and $I_{INIT\text{-}3}$ individually corresponding to the battery cells 4-1, 4-2 and 4-3, respectively, based in whole or in part on estimated present depth of discharge values provided by the DVC component 18 based on the battery model 18a and measured cell voltages from the sensors 20. The determined initial balancing bypass current values $I_{INIT\text{-}1}$, $I_{INIT\text{-}2}$ and $I_{INIT\text{-}3}$ each represent the amount of bypass current needed from the present time until the prospective end of the charge/discharge operation in order to balance the DOD values of all the cells 4-1, 4-2 and 4-3 by the end of that operation. The initial balancing component 16a can compute these initial balancing bypass current values $I_{INIT\text{-}1}$, $I_{INIT\text{-}2}$ and $I_{INIT\text{-}3}$ using any suitable algorithms, formulas, estimation processes, numerical techniques, parametric equations, etc. by which values are provided or estimated to represent the amount of such initial balancing bypass currents that will place the cells of the battery pack 4 on a trajectory from the present time until the prospective end of the charging/discharging operation for ultimate DOD balancing.

Figure 3:
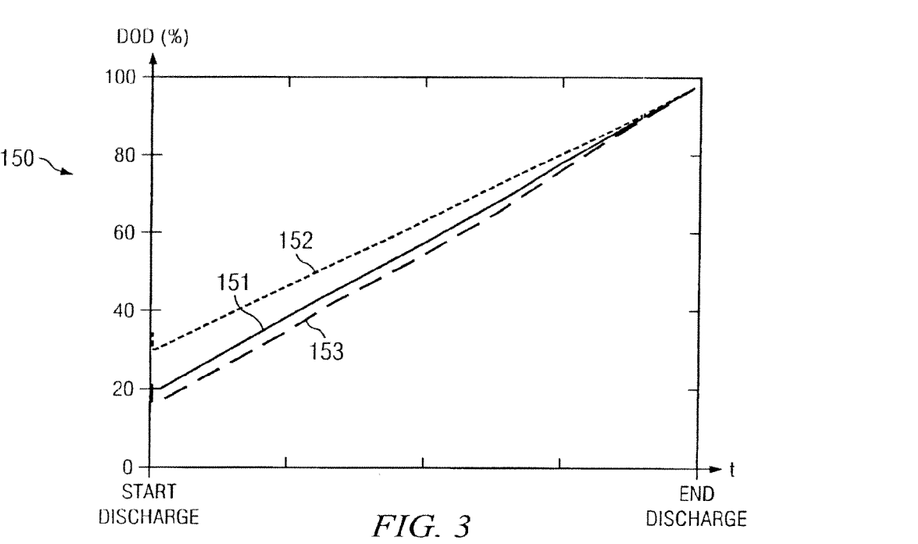
FIG. 3 illustrates a graph showing use of active bypass currents to balance depth of discharge values for a plurality of battery cells in the battery pack of FIG. 1 by the end of a discharge operation.

FIG. 3 illustrates a graph 150 showing DOD balancing for the 3-S pack 4 of FIG. 1 to balance depth of discharge values 151, 152 and 153 corresponding to the cells 4-1, 4-2 and 4-3, respectively. In this example, as time progresses from the start of an exemplary discharging operation, the DOD values 151-153 converge such that by the end of the discharge, all the cells 4-1, 4-2 and 4-3 are completely discharged (100% DOD). In this regard, the initial balancing component 16a computes the initial balancing bypass current values $I_{INIT\text{-}1}$, $I_{INIT\text{-}2}$ and $I_{INIT\text{-}3}$ to ideally spread this convergence over the entire length of time between the present time and the end of the prospective discharge operation. The same is true during charging operations, and the initial balancing current value determination is repeated in each time interval 164 relative to the prospective end time of the operation, whether discharging or charging.

The continuous balancing bypass current values $I_{CONT\text{-}1}$, $I_{CONT\text{-}2}$ and $I_{CONT\text{-}3}$ individually correspond to the battery cells 4-1, 4-2 and 4-3, and represent the amount of bypass current needed in the present time interval 164 to maintain a present relationship of the cell DOD values. The continuous balancing component 16b determines the values $I_{CONT\text{-}1}$, $I_{CONT\text{-}2}$ and $I_{CONT\text{-}3}$ based at least partially on differences in total charge capacity values (QMAX) of the battery cells 4-1, 4-2 and 4-3, and also according to the total pack current value 24 from the sensor 22 representing total present current flow in the battery pack 4. The continuous balancing values $I_{CONT\text{-}1}$, $I_{CONT\text{-}2}$ and $I_{CONT\text{-}3}$ thus provide a component amount of desired balancing current (bypass current) to sustain the current DOD relationships within the pack 4.

The predictive balancing component 16 in certain embodiments computes desired or requested cell bypass current values $I_{REQ-1}$, $I_{REQ-2}$ and $I_{REQ-3}$ for each of the cells 4-1, 4-2 and 4-3 for each of the time intervals 164 based at least partially on the determined initial balancing bypass current values $I_{INIT-1}$, $I_{INIT-2}$ and $I_{INIT-3}$ and on the continuous balancing bypass current values $I_{CONT-1}$, $I_{CONT-2}$ and $I_{CONT-3}$. In one possible implementation, the requested current value computation is performed by a balancing current enforcement component 16c, which computes the on times 17 at least partially according to summations of corresponding initial balancing bypass current values $I_{INIT-1}$, $I_{INIT-2}$, $I_{INIT-3}$ with corresponding continuous balancing bypass current values $I_{CONT-1}$, $I_{CONT-2}$, $I_{CONT-3}$. In this manner, the predictive balancing component 16 provides the on times 17-1, 17-2, 17-3 and/or 17-4 to provide both predictive initial balancing such that the DOD values of the associated battery cells 4 converge toward equilibrium over the course of a prescribed charging and/or discharging operation (FIG. 3), as well as continuous balancing to maintain or regulate the current DOD cell relationships to counteract any effects of overall pack current flow, load changes, and other effects. Without wishing to be tied to any particular theories, this predictive active cell balancing approach is believed to be particularly advantageous in the context of the asymmetric battery packs 4, wherein the use of depth of discharge balancing is believed to facilitate performance and stability improvement over conventional voltage-equalizing cell balancing techniques.

The balancing current enforcement component 16c in certain implementations determines theoretical maximum bypass current values $I_{MAX-1}$, $I_{MAX-2}$, and $I_{MAX-3}$ individually corresponding to the corresponding cells 4-1, 4-2 and 4-3. The maximum bypass current values $I_{MAX-1}$, $I_{MAX-2}$, and $I_{MAX-3}$ are computed in certain embodiments at least partially based on component values of the inductors L-1 and L-2, as well as on the switching frequency 182 of the switching controller 12 (e.g., 2 MHz or a lower adjusted value in certain implementations) assuming the switching controller 12 provides the switching control signals 14 at the switching frequency 182 for the entire time intervals 164. For a given switching frequency setting, therefore, the maximum bypass current values are the theoretical upper limit to the amount of bypass current that can be conducted in a given time interval 164. The enforcement component 16c, moreover, determines the desired or requested cell bypass current values $I_{REQ-1}$, $I_{REQ-2}$ and $I_{REQ-3}$ based on summations of the corresponding initial balancing and continuous balancing bypass current values (e.g., $I_{REQ-1}=I_{INIT-1}+I_{CONT-1}$; $I_{REQ-2}=I_{INIT-2}+I_{CONT-2}$; $I_{REQ-3}=I_{INIT-3}+I_{CONT-3}$; and $I_{REQ-4}=I_{INIT-4}+I_{CONT-4}$). The balancing current enforcement component 16c then determines the channel on times 17 as a fraction of a present time interval 164 (e.g., as a percentage or a time value) based at least partially on the ratio of the corresponding requested cell bypass current value $I_{REQ}$ and the corresponding theoretical maximum bypass current value $I_{MAX}$ in consideration of the effect of the bypass circuit configuration on the amount of bypass current provided to or removed from a given cell 4 in a given time interval 164.

The balancing current enforcement component 16c in certain embodiments also computes or otherwise determines actual cell bypass current values of a previous time interval 164 based in whole or in part on estimated actual cell bypass current values obtained from the DV C component 18, the total pack current value 24, and on a bypass efficiency parameter, and the bypass efficiency parameter may be adapted over time in certain embodiments. The enforcement component 16c also determines scaling factors S-1, S-2, S-3 corresponding to the battery cells 4-1, 4-2, 4-3. The individual scaling factors S-1, S-2, S-3 for the present time interval 164 are computed in certain embodiments as the ratio of the corresponding requested cell bypass current value (e.g., $I_{REQ-1}$, $I_{REQ-2}$, $I_{REQ-3}$) from the previous time interval 164 and a corresponding actual cell bypass current value of the previous time interval 164 multiplied by the corresponding scaling factor S-1, S-2, S-3 from the previous time interval 164, and determines the theoretical maximum current values $I_{MAX-1}$, $I_{MAX-2}$, and $I_{MAX-3}$ based at least partially on the scaling factors S-1, S-2, S-3. In this manner, the balancing component 16 uses the feedback information provided by the actual bypass current flow values to adjust the computation of the maximum currents for the succeeding time interval 164. In practice, the scaling factors S are ideally unity, and deviation from this value indicates a difference between the theoretical current and the actual current for each cell 4. Usage of the scaling factors in a series of time intervals gradually causes the error to reduce to zero over time as the requested currents and the actual currents converge.

As discussed in connection with FIG. 4 below, moreover, the balancing current enforcement component 16c selectively lowers the switching frequency 182 of the switching controller 12 if one or more of the on times exceeds a duration of a present time interval or if at least one of the requested cell bypass current values $I_{REQ-1}$, $I_{REQ-2}$ and/or $I_{REQ-3}$ exceeds the corresponding theoretical maximum value $I_{MAX-1}$, $I_{MAX-2}$, or $I_{MAX-3}$. This functionality advantageously permits initial operation at a relatively high switching frequency (e.g., 2 MHz in one example), and if higher bypass current levels are needed, the switching frequency of the switching controller 12 is reduced by the enforcement component 16c, for example, by half. This, in turn, means that the selected switching device Q1, Q2, Q3 or Q4 will be on for a longer period of time, and thus the current flowing through the bypass circuit 6 will increase. Accordingly, the maximum current computation will increase with the frequency reduction, which will result in computation of correspondingly lower on times 17. In this manner, the suitable amount of average current can be provided for active balancing during the on time of a given time interval 164, wherein certain embodiments of the enforcement component 16c will use a higher frequency where possible to mitigate voltage spikes associated with higher maximum currents, and then selectively reduce the frequency of the switching controller 12 as needed to accommodate higher bypass current requirements. This ability, moreover, is particularly advantageous in connection with balancing asymmetric battery packs 4 in which the bypass current levels may be significantly higher at times than those required for balancing symmetric battery packs.

Figure 5:
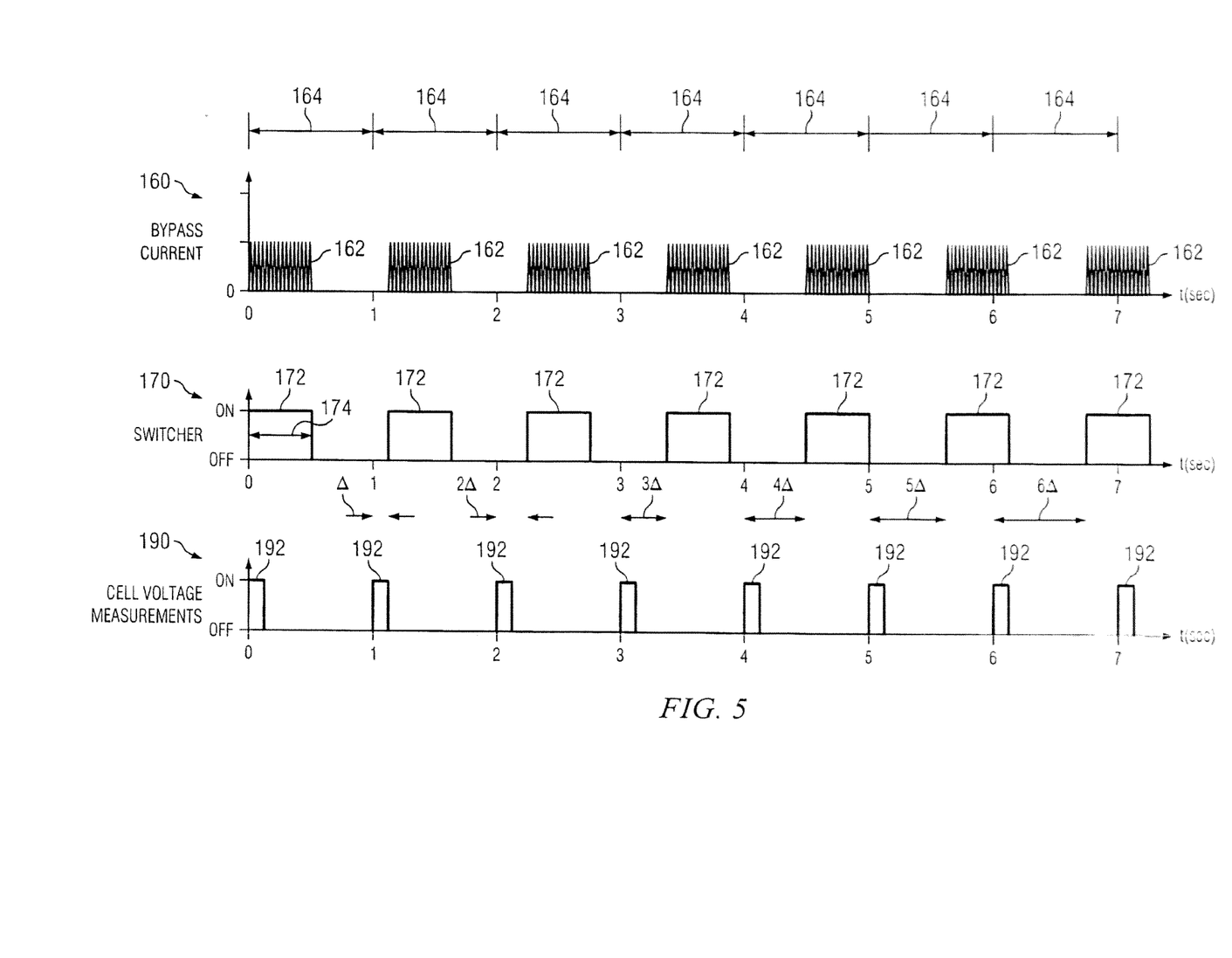
FIG. 5 illustrates cell bypass current waveforms, switcher on times, switcher frequency and cell voltage measurement periods in which the starting time of provision of the bypass circuit switching control signals is adjusted in successive periodic time intervals.
Figure 6:
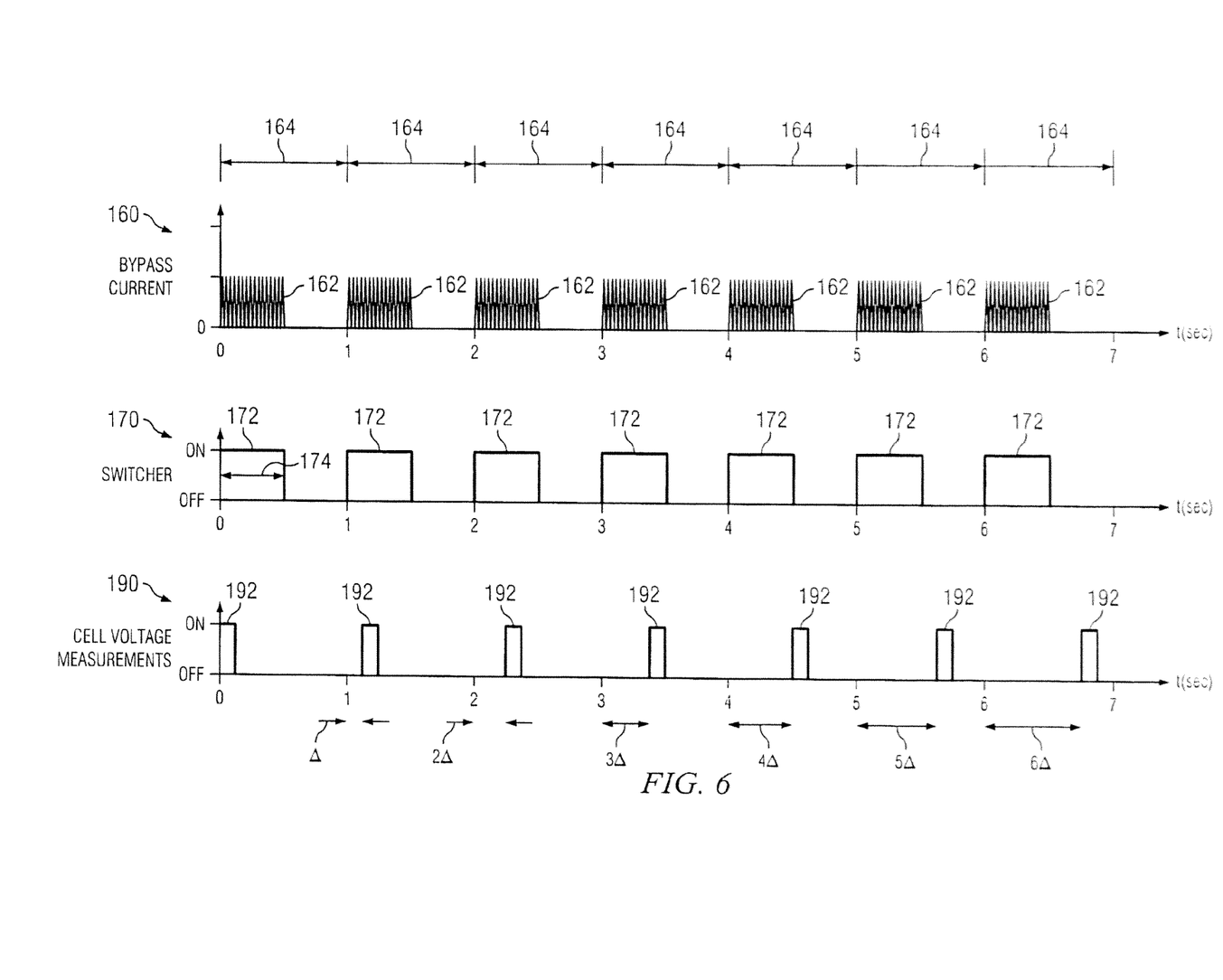
FIG. 6 illustrates cell bypass current waveforms, switcher on times, switcher frequency and cell voltage measurement periods in which the starting time of cell voltage measurements is adjusted in successive periodic time intervals.

In certain embodiments, the balancing current enforcement component 16c may also selectively adjust the relative timing of cell voltage measurements relative to the beginning of bypass current switching. In particular, FIGS. 5 and 6 illustrate shifting of the initial provision of the switching control signals 14-1, 14-2, 14-3, 14-4 during on times 174 relative to the cell voltage measurement during cell voltage measurement times 192 within successive periodic time intervals 164. This relative shifting may advantageously reduce or mitigate the correlation of bypass current switching effects with voltage measurements and thereby mitigate errors in any resulting derived or estimated cell current values.

Figure 2A:
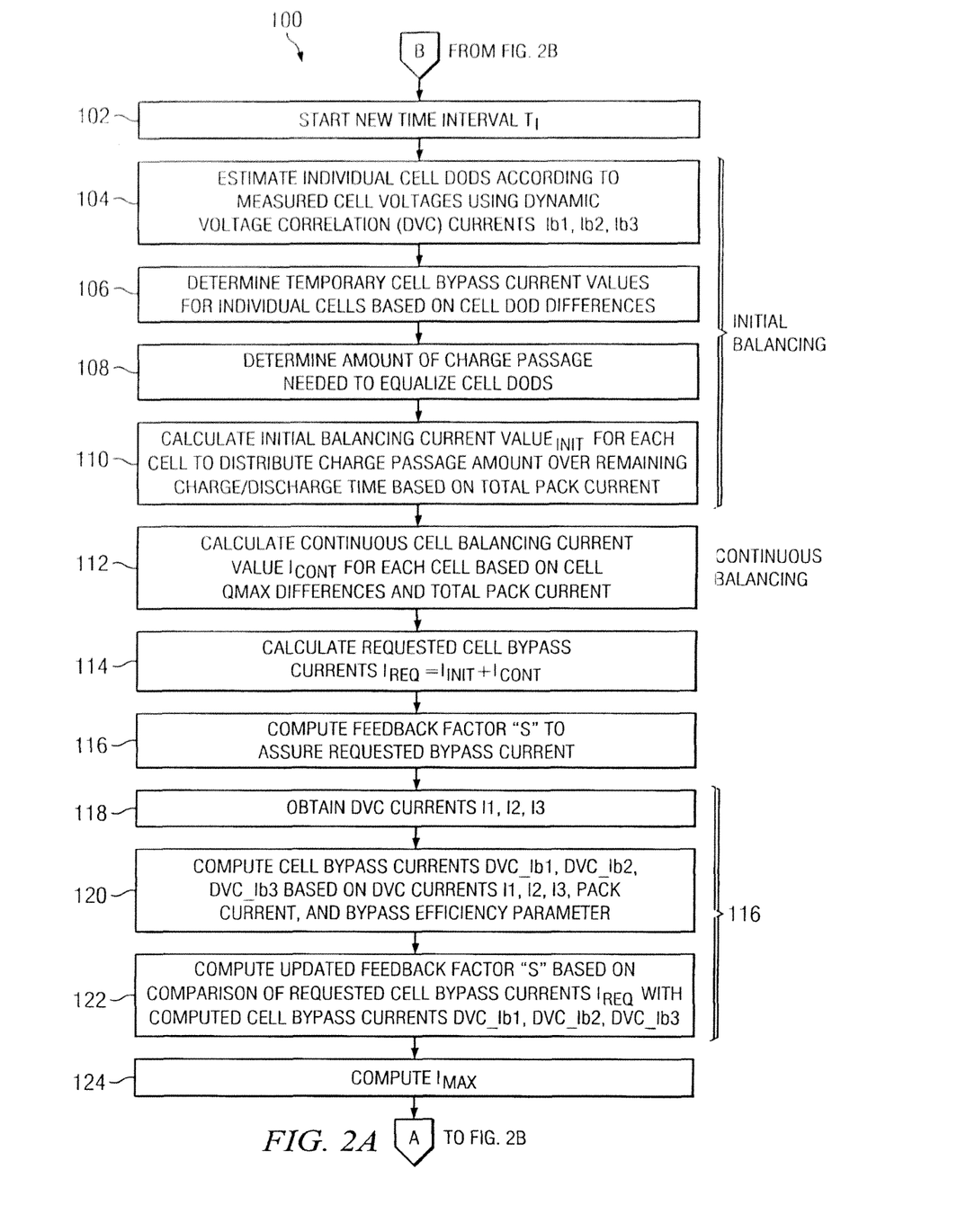
FIGS. 2A and 2B illustrate a flow diagram including a method for managing a battery pack through control of active balancing currents according to initial balancing and continuous balancing bypass current values.
Figure 2B:
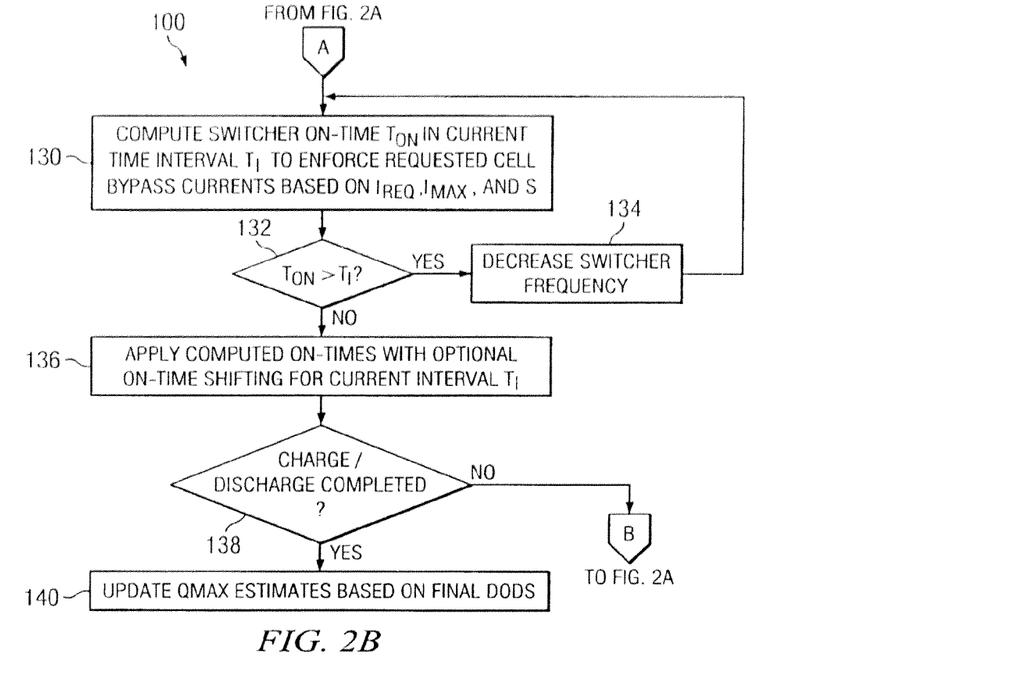

FIGS. 2A and 2B illustrate a method 100 for managing a battery pack through control of active balancing currents according to initial balancing and continuous balancing bypass current values. While the exemplary method 100 is depicted and described in the form of a series of acts or events, it will be appreciated that the various methods of the disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. The illustrated methods may be implemented in hardware, processor-executed software, or combinations thereof, in order to provide the predictive cell balancing concepts disclosed herein. In certain embodiments, the process or method 100 may be implemented in the battery management system 2 for active cell balancing during charging and/or discharging operations using the predictive balancing component 16 described above.

A new time interval $T_I$ begins at 102 in FIG. 2A (e.g., time interval 164 in FIGS. 4-6 below), including initial balancing processing at 104-110. Individual cell DOD values are estimated at 104 according to measured cell voltages. The cell DOD estimation at 104 can be done using any suitable state of charge (SOC) or depth of discharge computation/estimation techniques according to one or more measured values. For instance, the balancing controller 10 in FIG. 1 can utilize the dynamic voltage correlation component 18 to provide estimated DOD values for the battery cells 4-1, 4-2 and 4-3 based on cell voltage measurements and a temperature measurement. At 106 in FIG. 2A, temporary cell bypass current values are determined for the cells 4 based on differences in the cell DOD values. At 108, the amount of charge passage needed to equalize the cell DOD values is determined, and initial balancing current values are calculated at 110 (e.g., values $I_{INIT-3}$ in the above 3-S battery pack example) to distribute the needed amount of charge passage over the remaining charge/discharge time based on the total pack current. For instance, the balancing controller 10 receives a total pack current signal or value 24 from the pack current sensor 22 in FIG. 1, and uses this at 110 to calculate the initial balancing current values $I_{INIT-1}$, $I_{INIT-2}$ and $I_{INIT-3}$.

At 112 in FIG. 2A, a continuous cell balancing current value (e.g., $I_{CONT-1}$, $I_{CONT-2}$, $I_{CONT-3}$) is determined for each of the battery cells based at least partially on total cell charge differences (e.g., differences in QMAX values of the cells 4) and according to the total pack current. Requested or desired cell bypass currents are determined at 114 for each of the battery cells, for example, as the sum of the corresponding initial and continuous balancing current values (e.g., $I_{REQ-1} = I_{CONT-1}$), and an optional feedback or scaling factor S (e.g., S-1, S-2 and S-3 above) is computed at 116. For instance, the scaling factors S may be computed in certain embodiments as the ratio of the requested and actual cell bypass current values from the previous time interval 164 multiplied by the scaling factor S from the previous time interval 164. As seen in FIG. 2A, this may include obtaining cell bypass current values I1, I2 and I3 from measurements and/or via estimation, such as using the DVC component 18 in FIG. 1. At 120, actual cell bypass currents DVC_Ib1, DVC_Ib2, DVC_Ib3 of a previous time interval 164 are determined based at least partially on the estimated actual cell bypass current values I1, I2 and I3, the total pack current value 24, and a bypass efficiency parameter. At 122, scaling factors (S-1, S-2, S-3) are computed for the present time interval 164 by comparing the requested and computed bypass currents, for example, as a ratio of a corresponding requested cell bypass current value $I_{REQ-i}$ from the previous time interval 164 and the corresponding actual cell bypass current value DVC_Ibi of the previous time interval 164, with the resulting ratio being multiplied in certain embodiments by the scaling factor S of the previous time interval 164. The theoretical maximum bypass current values (e.g., $I_{MAX-1}$, $I_{MAX-2}$, and $I_{MAX-3}$ above) are computed at 124.

Continuing in FIG. 2B, the switcher on time values 17 ($T_{ON}$) are computed for each of the switching controller channels at 130 for the current time interval 164 for enforcement of the requested cell bypass currents. In one example, such as described above, the on times may be computed at 130 at least partially according to the requested cell bypass current values $I_{REQ-i}$, the computed maximum bypass current values $I_{MAX-i}$, and the scaling factor S-i associated with the present time interval 164. In the illustrated embodiment, a determination is made at 132 (e.g., by the balancing current enforcement component 16c in FIG. 1) as to whether the computed on time is greater than the present time interval 164 (e.g., whether $T_{ON} > T_I$). If so (YES at 132), the switcher frequency is decreased at 134, and the on times are recomputed at 130 accordingly. If the on times are all less than or equal to the duration of the time interval 164 (NO at 132), the process 100 proceeds to 136 where the computed on times are applied (e.g., on-times 17-1, 17-2, 17-3 and 17-4 are provided to the switching controller 12 in FIG. 1), and the relative starts of the on times may optionally be shifted at 136 relative to cell voltage measurements (e.g., FIGS. 5 and 6 below). A determination is made at 138 in FIG. 2B as to whether a charging/discharging operation is completed. If not (NO at 130), the process 100 returns to 102 in FIG. 2A to begin a new time interval as described above. If the charge/discharge operation is completed (YES at 130 in FIG. 2B), maximum charge (QMAX) estimates are updated at 140 based on the final depth of discharge values for the battery cells 4, which can be used for gas gaging or other reporting functions.

Figure 4:
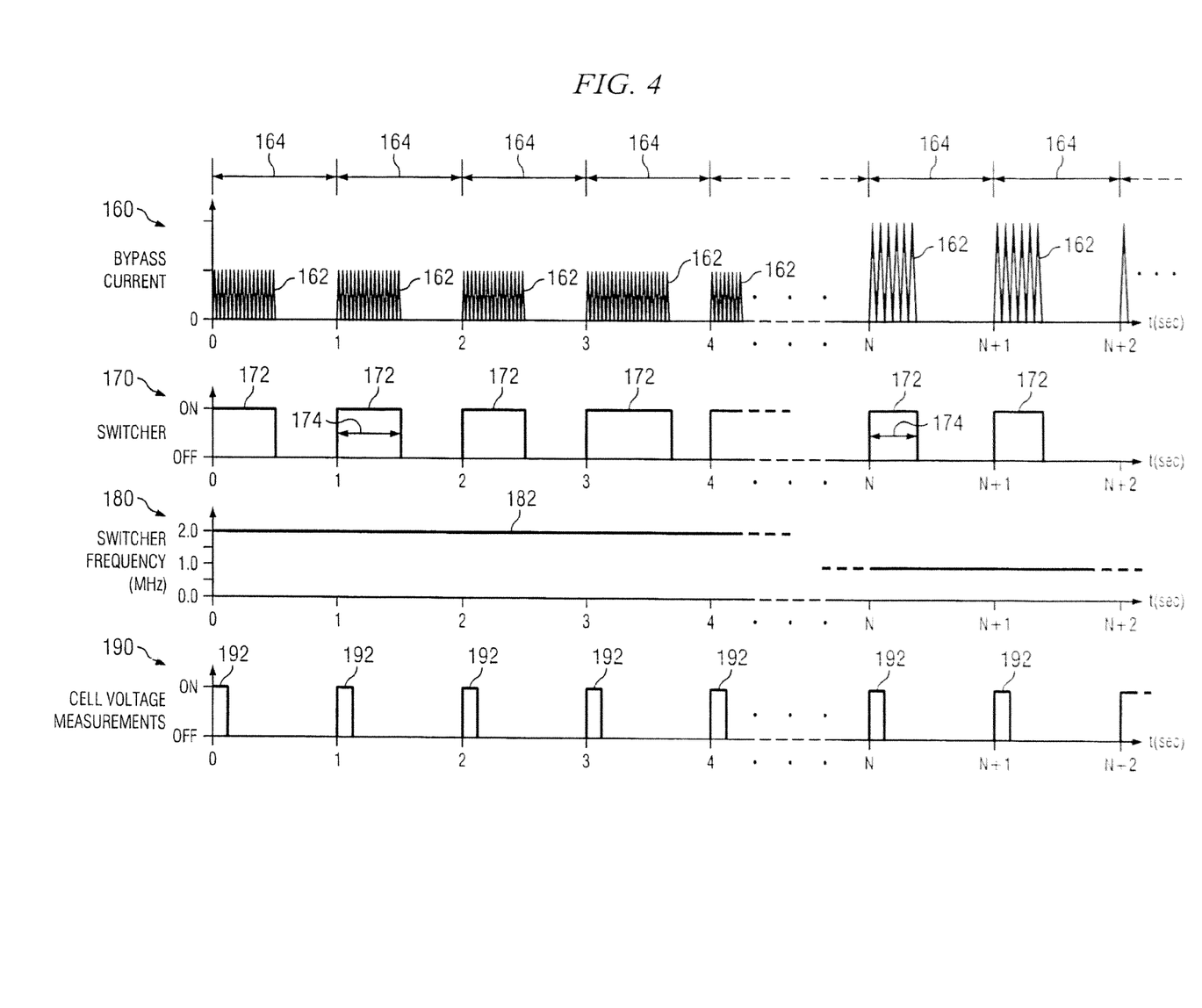
FIG. 4 illustrates cell bypass current waveforms, switcher on times, switcher frequency and cell voltage measurement periods as a function of time, with selective frequency adjustment in the system of FIG. 1.

Referring now to FIGS. 4-6, graphs 160, 170, 180 and 190 show bypass current, switcher on/off states, switcher frequency 182 and cell voltage measurement timing, respectively, as a function of time in the system 2 of FIG. 1. The graph 160 in FIG. 4 shows bypass current 162 for balancing transfer of charge between two of the cells in the battery pack 4, in which the switching is not necessarily drawn to scale relative to the periodic time intervals 164. In this regard, certain embodiments involve fairly high switching frequencies, such as 500 kHz through 2 MHz, with one second time intervals 164. The graph 180 in FIG. 4 illustrates initial operation of the system 2 using a switcher frequency 182 of about 2 MHz, and thereafter reduction of the switching frequency 182 to 1 MHz. Each cycle of the switcher (e.g., about 500 ns for a frequency 182 of 2 MHz) involves a ramp up and a ramp down of the bypass current 162, whereby it is appreciated that the temporal ramp up and ramp down of the bypass current is exaggerated in the figures for illustrative purposes. The graph 170 shows a switcher on/off condition 172 determined by the corresponding on time from the balancing controller 16. In this example, the corresponding on time of the switcher channel (e.g., one of the channel on times 17 in FIG. 1) has a length 174 of about 50% of the duration of the individual time intervals 164 initially, and increases somewhat at the third interval (at t=3). Thereafter at time "N", the balancing current enforcement component 16c reduces the switching frequency 182 by half (e.g., 21 MHz) while the length of the time intervals 164 remains the same. In addition, the computation of the on time length 174 is reduced by a factor of 2 due to the frequency-dependent computation in the balancing component 16. As a result, the corresponding switching device Q remains on twice as long in each high frequency cycle. This allows the bypass current 162 to increase to approximately twice the maximum reached during 2 MHz operation, and the ramping occurs for less total time, whereby the average current during each interval 164 is still determined according to the initial balancing and continuous balancing current values associated with or influenced by that channel.

FIG. 4 also illustrates a graph 190 showing the timing of cell voltage measurements 192 by the balancing controller 10. As seen in FIG. 4, the cell voltage measurements occur during the on time of the signal 192, which corresponds to operation of an analog-to-digital converter (ADC, not shown) of the balancing controller 10, which may be used to provide converted digital values associated with the sensed cell voltages based on analog signals provided by the cell voltage sensors 20. In certain embodiments, the cell voltage sensor signals are provided to a single ADC via a multiplexer, with the cell voltage measurements being done sequentially during the time period 192 in FIG. 4. As seen in the implementation of FIG. 4, the time 192 during which the cell voltage measurements occurs at the beginning of the time intervals 164, and the switcher on times 172 also begin at the start of each interval 164. This overlap in the time periods 172 and 192 may distort the cell current estimates that are based on the cell voltage measurements, wherein the influence of the bypass current conduction during the switcher on times 172 may cause noise in the voltage measurements during the time period 192.

Referring also to FIGS. 5 and 6, the predictive balancing component 16 is operative in certain embodiments to selectively adjust relative starting times of the switcher on times 172 and the voltage measurement times 192 in order to mitigate such noise or interference. FIG. 5 illustrates one possible solution in which the balancing component 16 adjusts the starting time of provision of the bypass circuit switching control signals (during the on times 172) in successive periodic time intervals while maintaining the cell voltage measurements during the time periods 192 generally at the start of each time interval 164 (or at the end of the intervals 164 or at some other static position). In this case, the switcher on-time 172 begins at the start of the time interval 164 at time T=0, and the switcher starting time is incremented by a delay amount Δ for each succeeding time interval 164. In this case, by the fifth time interval beginning at T=5, for example, the corresponding switcher on-time 172 begins 5Δ after the start of that interval 164. In this manner, there is no fixed relationship between the switcher on-time intervals 172 and the cell voltage measurement intervals 192. FIG. 6 shows an alternate approach in which the starting time of cell voltage measurements 192 is adjusted in successive periodic time intervals while maintaining the switcher on times 172 beginning at the start of each time interval 164 (or at some other fixed temporal position in the intervals 164). In this case, the cell voltage measurements occur at the beginning of the interval 164 at T=0, and thereafter the beginning of the cell voltage measurement period 192 is shifted by a delay amount Δ in each successive time interval 164.

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been disclosed with respect to only one of multiple implementations, such feature may be combined with one or more other features of other embodiments as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

What is claimed is:

1. A system for managing a battery pack, the battery pack comprising a plurality of battery cells with a corresponding plurality of depth of discharge values, the system comprising:
   a bypass circuit operatively coupled with the battery cells, the bypass circuit comprising: a plurality of switching devices and a plurality of energy storage components, the switching devices individually operable according to a corresponding switching control signal in a first state to cause conduction of bypass current from at least one of the battery cells to at least one of the energy storage components and in a second state to allow conduction of bypass current from at least one of the energy storage components to at least another one of the battery cells; and
   a switching controller operative to provide a plurality of switching control signals to the switching devices of the bypass circuit at a switching frequency for a corresponding plurality of on times in each of a plurality of periodic time intervals for active balancing of the battery cells; and
   a predictive balancing component operative to compute the plurality of on times as a function of a plurality of initial balancing bypass current values to balance the plurality of depth of discharge values by a prospective end of charge or end of discharge time, and as a function of a plurality of continuous balancing bypass current values to maintain a present relationship of the plurality of depth of discharge values.

2. The system of claim 1, wherein the balancing component comprises:
   an initial balancing component operative to determine the plurality of initial balancing bypass current values individually corresponding to one of the plurality of battery cells and individually representing an amount of bypass current needed from a present time until the prospective end of charge or end of discharge time to balance the plurality of depth of discharge values by the prospective end of charge or end of discharge time based at least partially on estimated present depth of discharge values for the battery cells; and
   a continuous balancing component operative to determine the plurality of continuous balancing bypass current values individually corresponding to one of the plurality of battery cells and individually representing an amount of bypass current needed at the present time to maintain a present relationship of the plurality of depth of discharge values, the continuous balancing component determining the plurality of continuous balancing bypass current values based at least partially on differences in total charge capacity values of the battery cells and on a total pack current value representing total current flow in the battery pack.

3. The system of claim 2, wherein the balancing component comprises a balancing current enforcement component operative to:
   determine a plurality of theoretical maximum bypass current values based at least partially on component values of the energy storage components and on the switching frequency of the switching controller assuming the switching controller provides the switching control signals at the switching frequency for the entire time intervals;
   determine a plurality of requested cell bypass current values as individual sums of a corresponding one of the initial balancing bypass current values with a corresponding one of the plurality of continuous balancing bypass current values; and determine individual ones of the plurality of on times as a fraction of a present time interval based at least partially on a ratio of the corresponding requested cell bypass current value and the corresponding theoretical maximum bypass current value.

4. The system of claim 3, wherein the balancing current enforcement component is operative to selectively lower the switching frequency of the switching controller if one or more of the on times exceeds a duration of a present time interval.

5. The system of claim 4, wherein the predictive balancing component is operative to selectively adjust relative starting times of provision of the switching control signals to the switching devices and a cell voltage measurement within successive periodic time intervals.

6. The system of claim 3, wherein the predictive balancing component is operative to selectively adjust relative starting times of provision of the switching control signals to the switching devices and a cell voltage measurement within successive periodic time intervals.

7. The system of claim 3, wherein the predictive balancing component is operative to:

determine a plurality of actual cell bypass current values of a previous time interval based at least partially on a plurality of estimated actual cell bypass current values, the total pack current value, and a bypass efficiency parameter;

determine a plurality of scaling factors individually corresponding to one of the plurality of battery cells, the individual scaling factors for the present time interval being computed as a ratio of a corresponding one of the requested cell bypass current values from the previous time interval and a corresponding one of the plurality of actual cell bypass current values of the previous time interval multiplied by the corresponding scaling factor from the previous time interval; and determine the plurality of theoretical maximum current values based at least partially on the plurality of scaling factors.

8. The system of claim 2, wherein the predictive balancing component is operative to compute the individual on times based at least partially on summations of corresponding initial balancing bypass current values with corresponding continuous balancing bypass current values, and to selectively lower the switching frequency of the switching controller if one or more of the on times exceeds a duration of a present time interval.

9. The system of claim 8, wherein the predictive balancing component is operative to selectively adjust relative starting times of provision of the switching control signals to the switching devices and a cell voltage measurement within successive periodic time intervals.

10. The system of claim 1, wherein the predictive balancing component is operative to compute the individual on times based at least partially on summations of corresponding initial balancing bypass current values with corresponding continuous balancing bypass current values, and to selectively lower the switching frequency of the switching controller if one or more of the on times exceeds a duration of a present time interval.

11. The system of claim 10, wherein the predictive balancing component is operative to selectively adjust relative starting times of provision of the switching control signals to the switching devices and a cell voltage measurement within successive periodic time intervals.

12. The system of claim 1, wherein the predictive balancing component is operative to selectively adjust relative starting times of provision of the switching control signals to the switching devices and a cell voltage measurement within successive periodic time intervals.

13. A method for equalizing charge in a battery pack having a plurality of battery cells with a corresponding plurality of depth of discharge values, the method comprising:

coupling the battery pack comprising the plurality of battery cells to a balancing controller circuit having a switching controller circuit and a balancing component;

determining a plurality of initial balancing bypass current values based at least partially on estimated present depth of discharge values for the battery cells, the initial balancing bypass current values individually corresponding to one of the plurality of battery cells and individually representing an amount of bypass current needed from a present time until a prospective end of charge or end of discharge time to balance the plurality of depth of discharge values by the prospective end of charge or end of discharge time;

determining a plurality of continuous balancing bypass current values based at least partially on differences in total charge capacity values of the battery cells and on a total pack current value representing total current flow in the battery pack, the continuous balancing bypass current values individually corresponding to one of the plurality of battery cells and individually representing an amount of bypass current needed at the present time to maintain a present relationship of the plurality of depth of discharge values;

determining a plurality of on times for the switching controller to drive a plurality of switches to control conduction of bypass currents to and/or from individual ones of the battery cells in a present time interval based at least partially on the initial balancing bypass current values and the continuous balancing bypass current values; and controlling conduction of bypass currents to and/or from individual ones of the battery cells in the present time interval based at least partially on the plurality of on times.

14. The method of claim 13, comprising:

determining a plurality of theoretical maximum bypass current values individually corresponding to one of the battery cells based at least partially on component values of energy storage components of a bypass circuit connected to the battery cells and on a switching frequency of a switching controller operating switching devices of the bypass circuit;

determining a plurality of requested cell bypass current values as individual sums of a corresponding one of the initial balancing bypass current values with a corresponding one of the plurality of continuous balancing bypass current values; and determining individual ones of the plurality of on times based at least partially on a ratio of the corresponding requested cell bypass current value and the corresponding theoretical maximum bypass current value.

15. The method of claim 14, comprising:

determining a plurality of actual cell bypass current values of a previous time interval based at least partially on a plurality of estimated actual cell bypass current values, the total pack current value, and a bypass efficiency parameter;

determining a plurality of scaling factors individually corresponding to one of the plurality of battery cells, including computing individual scaling factors for the present time interval as a ratio of a corresponding one of the requested cell bypass current values from the previous time interval and a corresponding one of the plurality of actual cell bypass current values of the previous time interval multiplied by a corresponding scaling factor from the previous time interval; and determining the plurality of theoretical maximum current values based at least partially on the plurality of scaling factors.

16. The method of claim 13, comprising:

computing the individual on times based at least partially on summations of corresponding initial balancing bypass current values with corresponding continuous balancing bypass current values; and selectively lowering the switching frequency of the switching controller if one or more of the on times exceeds a duration of a present time interval.

17. The method of claim 16, comprising selectively adjusting relative starting times of provision of the switching control signals to a bypass circuit connected to the battery cells and a cell voltage measurement within successive periodic time intervals.

18. The method of claim 13, comprising selectively adjusting relative starting times of provision of the switching control signals to a bypass circuit connected to the battery cells and a cell voltage measurement within successive periodic time intervals.

19. A non-transitory computer readable medium with computer executable instructions for equalizing charge in a battery pack having a plurality of battery cells with a corresponding plurality of depth of discharge values, the computer readable medium comprising computer executable instructions for a computer circuit having a switching controller circuit and a balancing circuit operating under control of the computer executable instructions:

determining a plurality of initial balancing bypass current values based at least partially on estimated present depth of discharge values for the battery cells, the initial balancing bypass current values individually corresponding to one of the plurality of battery cells and individually representing an amount of bypass current needed from a present time until a prospective end of charge or end of discharge time to balance the plurality of depth of discharge values by the prospective end of charge or end of discharge time;

determining a plurality of continuous balancing bypass current values based at least partially on differences in total charge capacity values of the battery cells and on a total pack current value representing total current flow in the battery pack, the continuous balancing bypass current values individually corresponding to one of the plurality of battery cells and individually representing an amount of bypass current needed at the present time to maintain a present relationship of the plurality of depth of discharge values;

determining a plurality of on times for the switching controller to drive a plurality of switches to control conduction of bypass currents to and/or from individual ones of the battery cells in a present time interval based at least partially on the initial balancing bypass current values and the continuous balancing bypass current values; and controlling conduction of bypass currents to and/or from individual ones of the battery cells in the present time interval based at least partially on the plurality of on times.

20. The computer readable medium of claim 19, comprising computer-executable instructions for:

determining a plurality of theoretical maximum bypass current values individually corresponding to one of the battery cells based at least partially on component values of energy storage components of a bypass circuit connected to the battery cells and on a switching frequency of a switching controller operating switching devices of the bypass circuit;

determining a plurality of requested cell bypass current values as individual sums of a corresponding one of the initial balancing bypass current values with a corresponding one of the plurality of continuous balancing bypass current values; and determining individual ones of the plurality of on times based at least partially on a ratio of the corresponding requested cell bypass current value and the corresponding theoretical maximum bypass current value.

* * * * *